United States Patent
Fan et al.

(10) Patent No.: US 9,753,813 B1
(45) Date of Patent: Sep. 5, 2017

(54) DATA REPLICATION SNAPSHOTS FOR PERSISTENT STORAGE USING OPERATION NUMBERS

(71) Applicant: Amazon Technologies, Inc., Reno, NV (US)

(72) Inventors: Jianhua Fan, Issaquah, WA (US); Benjamin Arthur Hawks, Seattle, WA (US); Norbert Paul Kusters, Redmond, WA (US); Nachiappan Arumugam, Seattle, WA (US); Danny Wei, Seattle, WA (US); John Luther Guthrie, II, Bellevue, CA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 14/866,655

(22) Filed: Sep. 25, 2015

(51) Int. Cl.
*G06F 11/14* (2006.01)
*G06F 3/06* (2006.01)

(52) U.S. Cl.
CPC .......... *G06F 11/1448* (2013.01); *G06F 3/065* (2013.01); *G06F 3/067* (2013.01); *G06F 3/0619* (2013.01); *G06F 11/1464* (2013.01); *G06F 11/1471* (2013.01); *G06F 2201/84* (2013.01)

(58) Field of Classification Search
CPC .............. G06F 3/065; G06F 17/30088; G06F 2201/84; G06F 11/1471; G06F 3/0619; G06F 3/067; G06F 11/1448; G06F 11/1464
See application file for complete search history.

(56) References Cited

U.S. PATENT DOCUMENTS

| | | | | |
|---|---|---|---|---|
| 6,131,148 A | * | 10/2000 | West | G06F 11/1446 707/999.202 |
| 7,373,366 B1 | * | 5/2008 | Chatterjee | G06F 11/1451 |
| 8,843,441 B1 | * | 9/2014 | Rath | G06F 17/30578 707/614 |
| 8,880,488 B1 | * | 11/2014 | Xie | G06F 17/30374 707/704 |
| 9,239,766 B2 | * | 1/2016 | Burr | G06F 11/2064 |
| 2004/0268067 A1 | * | 12/2004 | Yamagami | G06F 11/1471 711/159 |
| 2014/0040199 A1 | * | 2/2014 | Golab | G06F 17/30309 707/634 |
| 2014/0181027 A1 | * | 6/2014 | Whitehead | G06F 17/30174 707/639 |
| 2016/0328168 A1 | * | 11/2016 | Wei | G06F 3/065 |

* cited by examiner

*Primary Examiner* — Sanjiv Shah
*Assistant Examiner* — Glenn Gossage
(74) *Attorney, Agent, or Firm* — Hogan Lovells US LLP

(57) ABSTRACT

Persistent storage for a master copy is provided using operation numbers. A master copy can include a persistent key-value store such as a B-tree with references to corresponding data. When provisioning a slave copy, the master copy sends a point-in-time copy of the B-tree to the slave copy, which stores a copy of the B-tree, allocates the necessary space, and updates the references of the B-tree to point to a local storage before the data is transferred. When writing the data to persistent storage, a snapshot created on the master copy is an operation that is replicated to the slave copy. The snapshot is generated using a volume view that includes changes to chunks of data of the master copy since a previous snapshot, as determined using the operation number for the previous snapshot. Data (and metadata) for the snapshot is written to persistent storage while new EO operations are processed.

20 Claims, 9 Drawing Sheets

DATA REPLICATION SNAPSHOTS FOR PERSISTENT STORAGE USING OPERATION NUMBERS

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. Multiple users can share resources such as remote servers and data repositories, wherein the users can concurrently send multiple requests to be executed against the same resource. The resources can be physical resources or virtual resources provided through virtualization.

Virtualized computing environments are frequently supported by block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. In order to provide for data redundancy and reduce the likelihood of data loss, many data volumes are replicated with two copies. It can be difficult to maintain consistency between copies due to events such as power failures, lost messages, and dropped connections. Further, conventional replication protocols require in-depth knowledge of the data being replicated, with each new feature wanting to use replication needing to change the replication protocol. Further still, conventional approaches for writing data to persistent storage in such systems is complex and requires additional logic and maintenance.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the aforementioned and other deficiencies experienced in conventional approaches to managing aspects of resource sharing and allocation in an electronic environment. In various embodiments a slave copy is provisioned for redundant data storage by first generating a point-in-time copy of a persistent key-value store, such as a B-tree, of a master copy that requires a slave for replication. The copy can be used to determine whether the slave is able to allocate the appropriate storage, for example, before the transfer of the actual data to be replicated begins. Such an approach can provide for a quick verification of the slave and minimize the amount of time and resources needed for such verification. When writing the data to persistent storage, a snapshot can be created on the master storage volume that is treated as an operation, and thus will be replicated to the slave using the replication protocol already in place. The snapshot can be generated using a volume view that includes changes to chunks of data on the volume that occurred since the last snapshot, as determined using the operation number for the previous snapshot. The data (and metadata) for the snapshot can be written to persistent storage while new I/O operations are received and processed.

Various other functions and advantages are described and suggested below as may be provided in accordance with the various embodiments.

Figure 1:
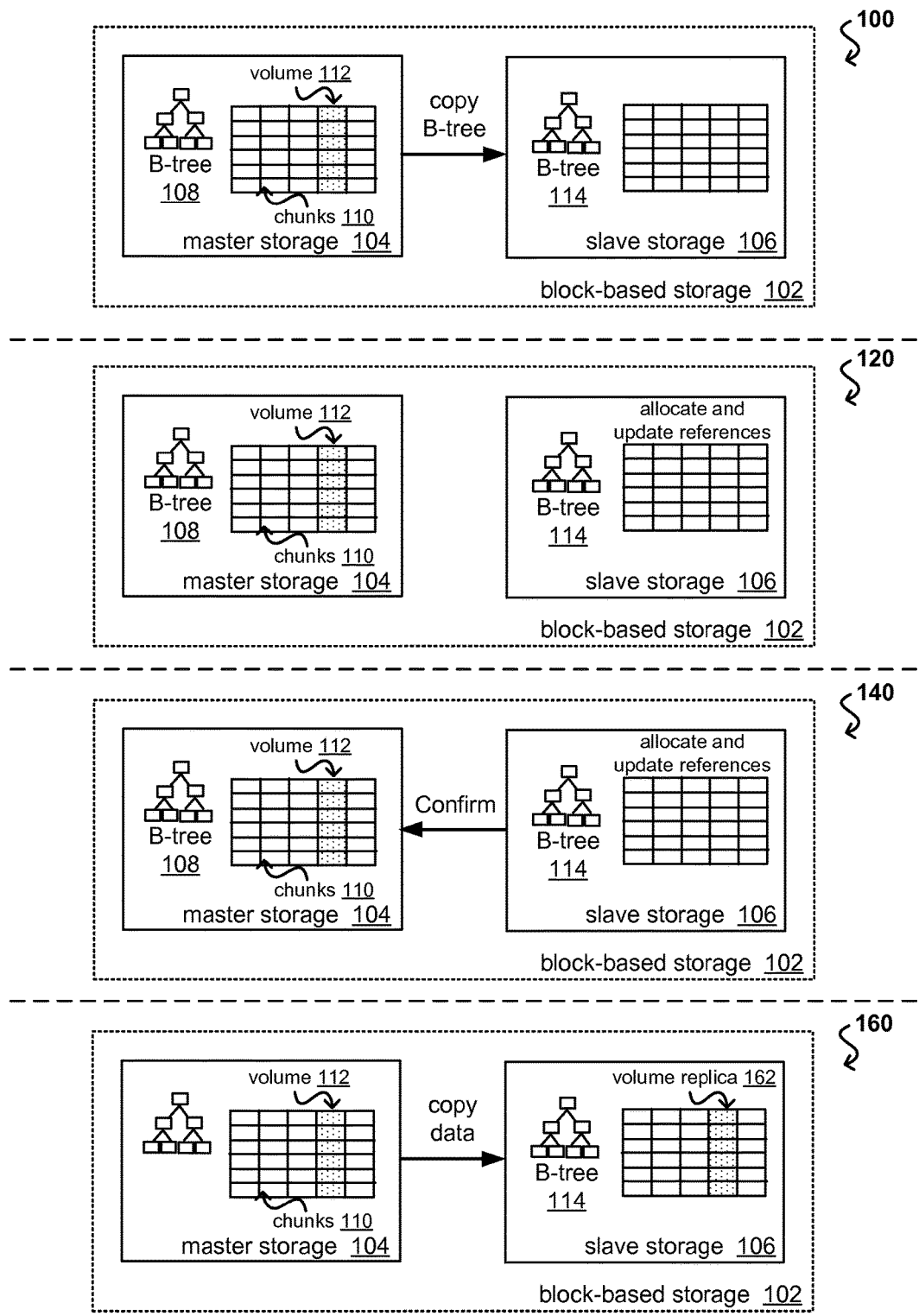
FIG. 1 illustrates a series of block diagrams demonstrating a provisioning process for a slave copy that can be utilized in accordance with various embodiments.

FIG. 1 illustrates a series of block diagrams demonstrating portions of an example process for provisioning a slave copy for a block-based storage 102 system or service. In this example, data storage volumes can be presented as block devices to customers, addressable via read/write requests using an offset, length, and data. A data volume 112 can be stored on a server along with a type of persistent key-value store, such as a B-tree 108 or other log-structured merge tree. A B-tree in general is a tree data structure that provides for sequential operations to be performed in logarithmic time. A B-tree is typically optimized for systems that manage large blocks of data. Internal nodes of a B-tree can have a variable number of child nodes within a pre-defined range, and the number of child nodes changes when data is inserted or removed from a node of the B-tree. Each internal node can contain a number of keys, which divide the sub-trees. A B-tree can maintain the keys in a sorted order, which enables sequential traversing of the tree structure.

A B-tree used for data volumes in accordance with various embodiments can be at least somewhat different from a conventional B-tree, as a B-tree in this example can store key, value, data-reference triplets, and can map those triplets to a block device representation. A data-reference is essentially a pointer to a location of the data. The data for a storage volume thus does not actually reside inside the volume's B-tree, but rather the B-tree points to the data. The main responsibility of the data storage volume is to store customer data, but arbitrary metadata can also be stored in the data storage volume in at least some embodiments.

In some embodiments, the master storage on a server can be divided into partitions, such as a log partition and a data partition. The log partition can consist of one or more devices, such as fast solid state drives (SSDs), with an appropriate log interface. The data partition can consist of a logical striping across a number of SSDs or magnetic drives, for example, and can present a block interface that can be written to randomly in at least some embodiments. There can be one log and one data partition per server, which can store multiple B-trees and associated data. It at least some embodiments the writes first go to the log and then can later be written to the data partition. In some embodiments the B-tree 108 for a volume is stored in the log and the corresponding data volume 112, to which the B-tree points, is stored in either the log or the data partition.

When a slave storage copy 106 is to be provisioned, a point-in-time snapshot of the master B-tree 108 can be generated and sent to the slave 106, as indicated in the first situation 100 of FIG. 1. The slave 106 can store a local copy 114 of the B-tree in an appropriate location, such as log storage for the slave, and determine an amount of space to allocate for the data indicated by the local copy 114. Since the B-tree will initially include references to storage locations local to the master 104, the slave can update the references to point to the allocated local storage as illustrated in the second example situation 120 illustrated in FIG. 1. The slave can allocate slightly more storage than is needed in order to allow for additional data or variations to be implemented that are received to the master during the replication process. Once the local copy 114 of the B-tree is updated and the appropriate local space allocated, the slave can send a confirmation or acknowledgement to the master 104, as indicated in the third example situation 140 of FIG. 1. The master storage 104 can then determine the chunks 110 of data for a current operation of the B-tree to transfer (copy or replicate) to the slave to be committed to the slave volume replica 162 until all data has been transferred or copied, and the slave is an up-to-date replica of the master, as indicated in the fourth example situation 160 of FIG. 1.

Since the point-in-time B-tree from the master is generally much smaller than the actual data to be copied, the slave can quickly determine whether adequate space is available for the data, and allocate that data as necessary, before the data transfer begins. If the provisioning of the slave needs to be cancelled or rolled back, for example, the quick determination results in minimal unnecessary data transfer or delay, particularly with respect to conventional provisioning approaches. Further, fixing the references in the slave B-tree does not involve any data transfer and is all local to the slave, such that the entire process of creating an updating the tree can be performed relatively quickly. This also minimizes the amount of data for new writes that must be stored during the provisioning process, which conserves resources and reduces the likelihood of an event that can cause inconsistencies between the copies, such as power failures or other such events.

Figure 2:
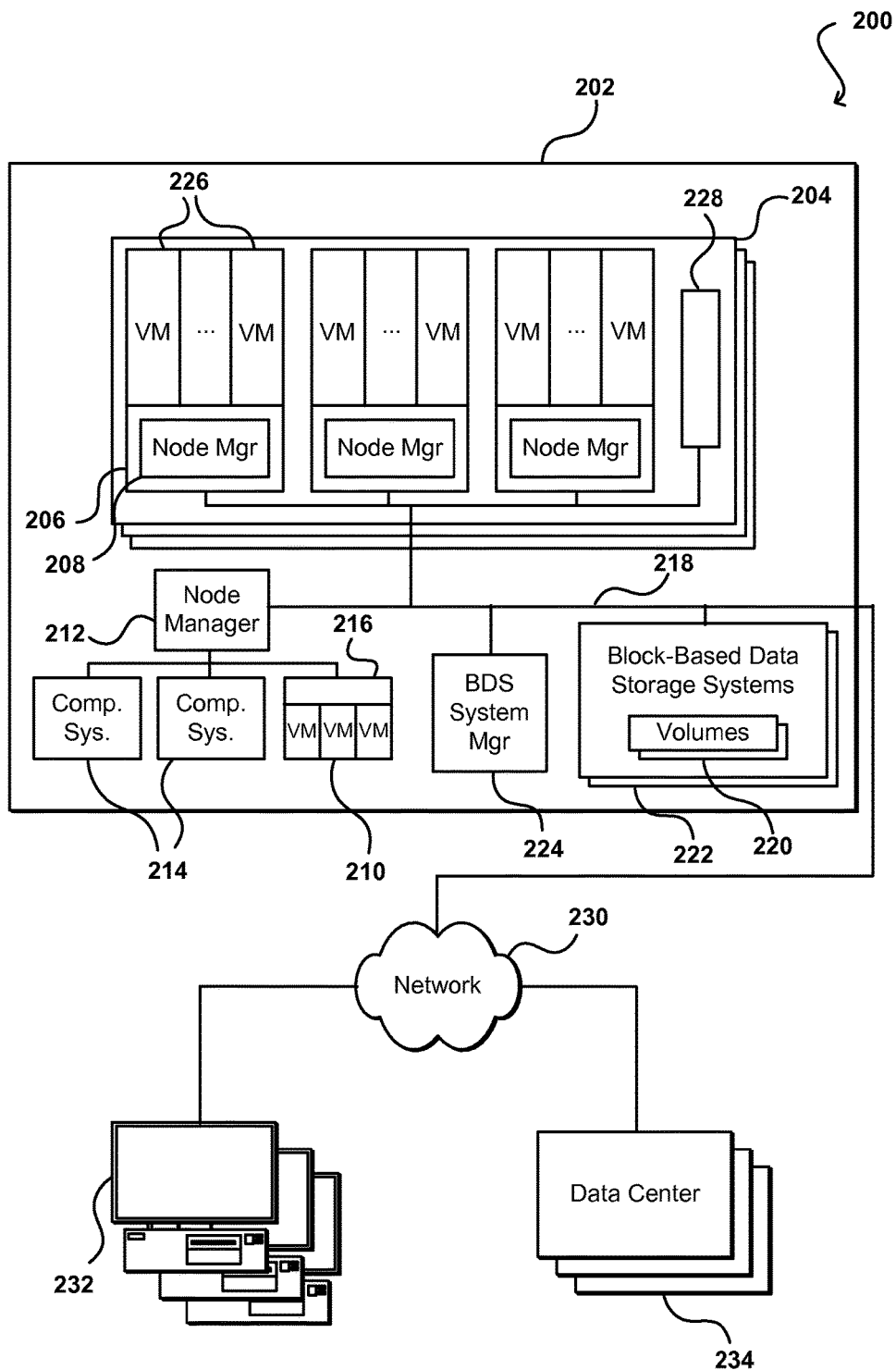
FIG. 2 illustrates an example environment in which aspects of the various embodiments can be implemented.

FIG. 2 illustrates an example network configuration 200 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 202 includes a number of racks 204, each rack including a number of host computing devices or systems 206, as well as an optional rack support computing system 228 in this example embodiment. The host computing devices or systems 206 on the illustrated rack 204 each host one or more virtual machines 226 in this example, as well as a distinct node manager module 212 associated with the virtual machines on that host computing system to manage those virtual machines. One or more other host computing systems 216 may also each host one or more virtual machines 210 in this example. Each virtual machine 210 may act as an independent resource node for executing one or more program copies or performing another such action or process for user data requests, I/O operations, etc. In addition, this example data center 202 further includes additional host computing systems 214 that do not include distinct virtual machines, but may nonetheless each act as a resource node for one or more tasks being executed for a user. In this example, a node manager module 212 executing on a computing system (not shown) distinct from the host computing systems 214 and 216 is associated with those host computing systems to manage the resource nodes provided by those host computing devices or systems, such as in a manner similar to the node manager modules 208 for the host computing devices or systems 206. The rack support computing system 228 may provide various utility services for other computing systems local to its rack 204 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example of the data center 202 also includes a computing system 224 that executes a block-based data storage ("BDS") system manager module for the block-based data storage service to assist in managing the availability of non-local block-based data storage to programs executing on resource nodes provided by the host computing systems located within the data center (or optionally on computing systems located in one or more other data centers 234, or other remote computing systems 232 external to the data center). In particular, in this example the data center 202 includes a pool of multiple block-based data storage systems 222, which each have local block-based storage for use in storing one or more volume copies 220. Access to the volume copies 220 is provided over the internal network(s) 218 to programs executing on various resource nodes (e.g., host computing systems 214 and virtual machines 210). As discussed in greater detail elsewhere, a block-based data storage system manager module 224 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS system manager module 224 may coordinate with the node manager modules 212, 208 to manage use of volumes by programs executing on associated resource nodes, while in other embodiments the node manager modules may not be used to manage such volume use. In addition, in other embodiments, one or more BDS system manager modules 224 may be structured in other manners, such as to have multiple instances of the BDS system manager executing in a single data center (e.g., to share the management of non-local block-based data storage by programs executing on the resource nodes provided by the host computing systems located within the data center), and/or such as to have at least some of the functionality of a BDS system manager module being provided in a distributed manner by software executing on some or all of the server block data storage systems 222 (e.g., in a peer-to-peer manner, without any separate centralized BDS system manager module on a computing system 224).

In this example, the various host computing systems, server block data storage systems, and computing systems are interconnected via one or more internal networks 218 of the data center, which may include various networking devices (e.g., routers, switches, gateways, etc.) that are not shown. In addition, the internal networks 218 are connected to an external network 230 (e.g., the Internet or another public data network) in this example, and the data center 202 may further include one or more optional devices (not shown) at the interconnect between the data center and an external network (e.g., network proxies, load balancers, network address translation devices, etc.). In this example, the data center 202 is connected via the external network 230 to one or more other data centers 234 that each may include some or all of the computing systems and storage systems illustrated with respect to data center 202, as well as other remote computing systems 232 external to the data center. The other computing systems 232 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 222 may further be interconnected with one or more other networks or other connection mediums, such as a high-bandwidth connection over which the block-based storage systems 222 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 2 has been simplified for the purposes of explanation, and that the number and organization of host computing systems, server block data storage systems and other devices may be much larger than what is depicted in FIG. 2. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, then such a data center may execute as many as tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 2 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 2, for example, a customer can make a Web service call into an appropriate Application Programming Interface (API) of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount of storage to be allocated, such as a value between 1 gigabyte (GB) and 1 terabyte (TB), in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume is not able to select or request a particular type of volume, or a particular type of performance. A customer is typically granted an amount of storage, and the performance follows a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

Figure 3:
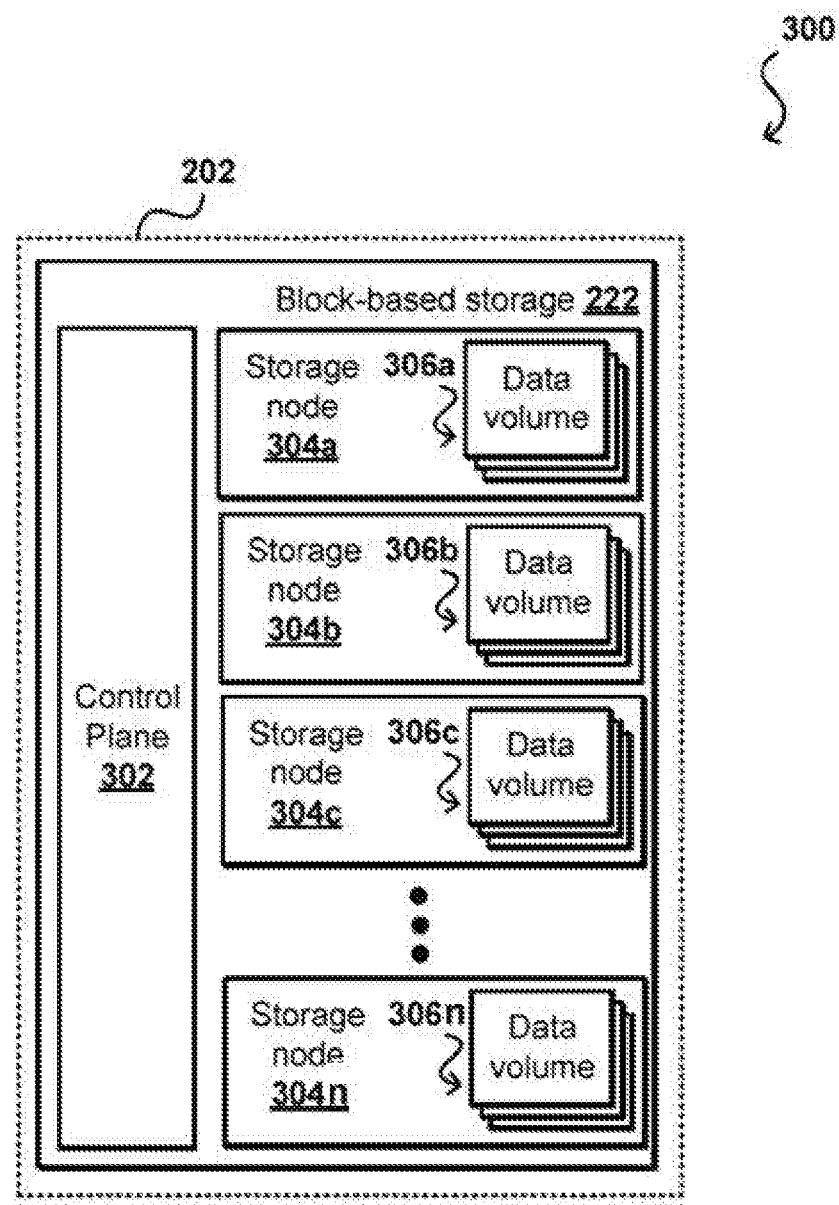
FIG. 3 illustrates components of an example block-based data storage service that can be utilized in accordance with various embodiments.

A block-based storage service provider can implement functionality such as page cache write logging and the dynamic modifying of durability properties for data volumes. FIG. 3 is a block diagram illustrating components of a provider environment 300, including data center 202 as described with respect to FIG. 2. It should be understood that reference numbers may be carried over between figures for similar elements for purposes of simplicity of understanding, but that such usage should not be interpreted as a limitation on the various embodiments unless otherwise explicitly stated herein. Multiple network-based services can be implemented in such an environment, and may include a block-based storage service in at least some embodiments. A provider environment 300, or other such multi-tenant or shared resource environment, may be set up by an entity such as a company or a public sector organization to provide one or more services (such as various types of cloud-based computing or storage) accessible via the Internet and/or other networks to clients. The provider environment 300 may also include numerous other data centers hosting various resource pools, such as collections of physical and/or virtualized computer servers, storage devices, networking equipment and the like, used to implement and distribute the infrastructure and services offered by the provider environment 300. In some embodiments, the provider environment 300, including data center 202, may provide computing resources, such as virtual compute services, storage services, and/or any other type of network-based services. Clients can access these various services offered by the provider environment over an appropriate network. Likewise, network-based services may themselves communicate and/or make use of one another to provide different services. For example, computing resources can be offered to clients in units called "instances," such as virtual or physical compute instances or storage instances that make use of particular data volumes, providing virtual block storage for the compute instances.

In various embodiments, the provider environment 300, including data center 202, implements block-based storage system or service for performing storage operations. Block-based storage system 222 may also be referred to herein as block-based storage service 222 or block-based storage 222. The example block-based storage 222 is composed of a pool of multiple independent storage nodes 304a, 304b, 304c through 304n (e.g., server block data storage systems), which provide block level storage for storing one or more sets of data volumes 306a, 306b, 306c, through 306n. The data volumes 306 (306a-306n) can be mapped to particular clients, providing virtual block-based storage (e.g., hard disk storage or other persistent storage) as a contiguous set of logical blocks. In some embodiments, a data volume 306 (306a-306n) may be divided up into multiple data chunks (including one or more data blocks) for performing other block storage operations, such as snapshot operations or replication operations.

A snapshot of a data volume 306 (306a-306n) may be a fixed point-in-time representation of the state of the data volume. In some embodiments, snapshots may be stored remotely from a storage node 304 (304a-304n) maintaining a data volume 306 (306a-306n), such as in another storage service. Snapshot operations may be performed to send, copy, and/or otherwise preserve the snapshot of a given data volume in another storage location, such as a remote snapshot data store in another storage service.

A block-based storage service 222 can implement a block-based storage service control plane 302 to assist in the operation of the block-based storage service 222. In various embodiments, the block-based storage service control plane 302 assists in managing the availability of block data storage to clients, such as programs executing on compute instances provided by a virtual compute service and/or other network-based services located within the provider environment 300 that includes data center 202 and/or optionally computing systems (not shown) located within one or more other data centers, or other computing systems external to the provider network and available over at least one network. Access to the data volumes 306 (306a-306n) may be provided over an internal network within the provider network 300, including data center 202, or externally via an appropriate network, in response to block data transaction instructions.

A block-based storage service control plane 302 can provide a variety of services related to providing block level storage functionality, including the management of user accounts (e.g., creation, deletion, billing, collection of payment, etc.). The block-based storage service control plane 302 may further provide services related to the creation, usage and deletion of data volumes 306 (306a-306n) in response to configuration or other such requests. The block-based storage service control plane 302 can also provide services related to the creation, usage, and deletion of volume snapshots on another storage service. The block-based storage service control plane 302 may also provide services related to the collection and processing of performance and auditing data related to the use of data volumes 306 (306a-306n) and snapshots of those volumes.

The provider environment 300, including data center 202, may also implement other storage services, as noted above. Another storage service may provide a same or different type of storage as provided by the block-based storage service 222. For example, in some embodiments another storage service may provide an object-based storage service, which may store and manage data as data objects. For example, volume snapshots of various data volumes 306 (306a-306n) may be stored as snapshot objects for a particular data volume 306 (306a-306n). In addition to another storage service, the provider environment 300, including data center 202, may implement other network-based services, which can include various different types of analytical, computational, storage, or other network-based system allowing clients, as well as other services of the provider environment (e.g., a block-based storage service, virtual compute service, and/or other storage service) to perform or request various tasks.

Client devices capable of interacting with the provider environment can encompass any type of device configurable to submit requests to the provider (network) environment 300. For example, a given client may include a suitable version of a Web browser, or may include a plug-in module or other type of code module configured to execute as an extension to, or within, an execution environment provided by a Web browser. Alternatively, a client may encompass an application such as a database application (or user interface thereof), a media application, an office application or any other application that may make use of compute instances, a data volume 306 (306a-306n), or other network-based service in the provider environment 300 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients may be configured to generate network-based service requests. In some embodiments, a client (e.g., a computational client) may be configured to provide access to a compute instance or data volume 306 (306a-306n) in a manner that is transparent to applications implemented on the client, utilizing computational resources provided by the compute instance or block storage provided by the data volume 306 (306a-306n).

Client devices can convey network-based services requests to the provider environment via an external network. In various embodiments, the external network may encompass any suitable combination of networking hardware and protocols necessary to establish network-based communications between the client devices and the provider environment. For example, a network may generally encompass the various telecommunications networks and service providers that collectively implement the Internet. A network may also include private networks such as local area networks (LANs) or wide area networks (WANs) as well as public or private wireless networks. For example, both a given client device and provider network may be respectively provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a networking link between a given client device and the Internet, as well as between the Internet and the provider environment. It is noted that in some embodiments, the clients may communicate with provider environment 202 using a private network rather than the public Internet.

Figure 4:
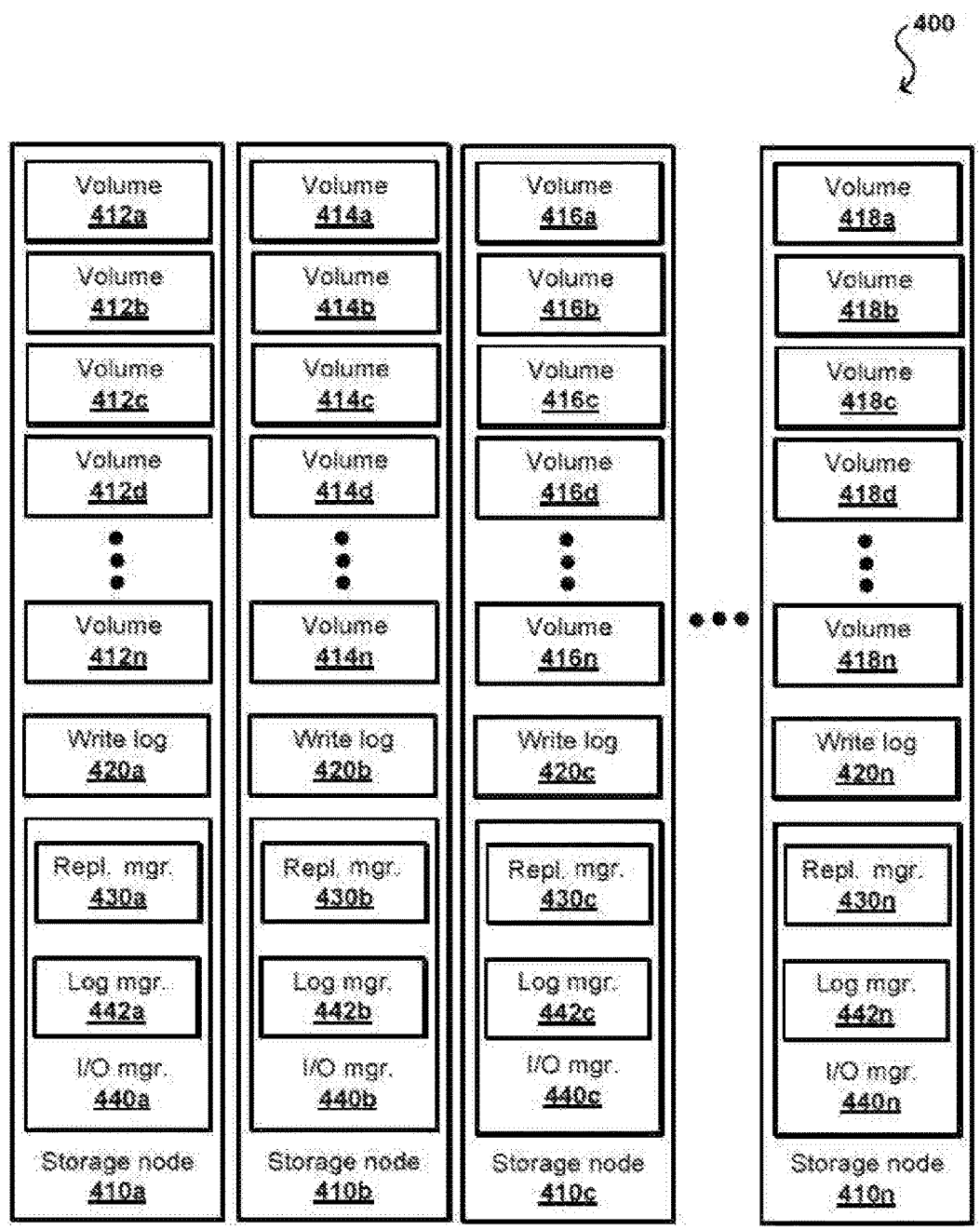
FIG. 4 illustrates a set of storage nodes that can be utilized in accordance with various embodiments.

FIG. 4 is a block diagram 400 illustrating storage nodes that implement write logs for updates to page caches implemented at the storage nodes and dynamically modifying durability properties for data volumes, according to some embodiments. Multiple storage nodes, such as storage nodes 410a, 410b, 410c, through 410n may be implemented in order to provide block-based storage services. A storage node 410 (410a-410n) can comprise one or more computing systems or devices, such as a storage server or other such computing system or device. Each storage node 410 (410a-410n) can maintain respective replicas of data volumes. For instance, a first storage node 410a maintains a set of data volumes 412 (412a-412n), while storage nodes 410b through 410n maintain other data volumes 414 (414a-414n), 416 (416a-416n), 418 (418a-418n), respectively. While the example storage nodes 410 (410a-410n) are depicted as having equal numbers of data volumes, numbers of data volumes maintained on storage nodes may vary between storage nodes. Some data volumes may also differ in size from other data volumes, in some embodiments. Storage nodes 410 (410a-410n) can be used to provide multi-tenant storage. For example, in some embodiments a data volume 416a maintained at a storage node 410c may be maintained for one account of the block-based storage service, while a different data volume 416b also maintained at the same storage node 410c may be maintained for a different account. Storage nodes 410 (410a-410n) can persist their respective data volumes in one or more block-based storage devices (e.g., hard disk drives, solid state drives, etc.) that may be directly attached to a computing system or device implementing the respective storage node.

In various embodiments, storage nodes 410 (410a-410n) may each implement at least one respective page cache. A page cache can be a portion of system memory or other memory device that stores pages or other groupings of data from one of the data volumes 412 (412a-412n) maintained in a respective storage node 410 (410a-410n). Instead of directly writing to or reading from a block-based storage device maintaining the portion of requested data of a data volume, the page cache may be updated. For example, if a read request is received for a portion of a data volume, it may first be determined whether the data resides in the page cache. If the data resides in the page cache then the data may be read from cache. If not, the data may be retrieved from the respective block-based storage device maintaining the portion of the requested data of the data volume and written into the page cache for future use. Similarly, a write request may be directed towards a data volume maintained in persistent block storage and may be first completed at the page cache. For a received write request, a page cache entry corresponding to the data to be written (e.g., a portion of a data volume already maintained in the page cache) may be updated according to the write request. Similarly, if the data to be modified by the write request is not in the page cache, the data may be first obtained from the block-based storage device that persists the data, written into a new page cache entry in the page cache, and then updated according to the write request. Page cache techniques are well-known to those of ordinary skill in the art, and thus, the previous examples are not intended to be limiting as to other page cache techniques.

In various embodiments, the storage nodes 410 (410a-410n) can implement respective write logs 420 (420a-420n). Page cache write logs, for example, may store log records describing updates to the respective page cache, such as write requests that modify data maintained in a page cache. Thus, in the event of a system or other failure that causes a loss of data in the page cache, log records in the write log 420 (420a-420n) can be used to restore the page cache to a state prior to the failure. Log records may be stored sequentially according to the order in which updates are made to page cache, in some embodiments. By storing log records sequentially, log records may be replayed or re-applied in the order in which they are stored to generate a state of the page cache at a particular point in time. The storage nodes 410 (410a-410n) can also implement respective input/output ("I/O") managers 440 (440a-440n). The I/O managers 440 (440a-440n) may handle I/O requests directed toward data volumes maintained at a particular storage node. Thus, an I/O manager 440b can process and handle a write request to a volume 414b at a particular storage node 410b, for example. An I/O manager 440 (440a-440n) can be configured to process I/O requests according to block-based storage service application programming interface (API) and/or other communication protocol(s), such as the Internet small computer system interface (iSCSI) protocol. In some embodiments, I/O managers 440 (440a-440n) implement respective log management or manager components 442 (442a-442n) and replication management or manager components 430 (430a-430n). The log management components can perform various log management functions, such as trimming log records and/or performing page cache recovery based, at least in part, on log records. The replication management components can perform various tasks, as discussed herein, related to volume replication.

A block-based storage service can manage and maintain data volumes in a variety of different ways. Different durability schemes may be implemented for some data volumes among two or more storage nodes maintaining a same replica of a data volume. For example, different types of mirroring and/or replication techniques may be implemented (e.g., RAID 1) to increase the durability of a data volume, such as by eliminating a single point of failure for a data volume. In order to provide access to a data volume, storage nodes may then coordinate I/O requests, such as write requests, among the two or more storage nodes maintaining a replica of a data volume. For example, for a given data volume 412a, a storage node 410a may serve as a master storage node. A master storage node may, in various embodiments, receive and process requests (e.g., I/O requests) from clients of the data volume. Thus, storage node 410a may then coordinate replication of the I/O requests, such as write requests, or any other changes or modifications to the data volume 412a to one or more other storage nodes serving as slave storage nodes. For instance, a storage node 410c may maintain a data volume 416d which is a replica of another data volume 412a. Thus, when a write request is received for the data volume 412a at the master storage node 410a, the master storage node 410a can be configured to forward the write request to the slave storage node 410c and wait until the slave storage node 410c acknowledges the write request as complete before completing the write request at the storage node 410 (410a-410n). Master storage nodes may direct other operations for data volumes, like snapshot operations or other I/O operations (e.g., serving a read request). It should be noted that, in some embodiments, the role of master and slave storage nodes may be assigned per data volume. For example, for a data volume 412a maintained at a first storage node 410a, that first storage node 410a may serve as a master storage node. While for another data volume, such as data volume 412b, maintained at storage node 410a, the storage node 410a may serve as a slave storage node.

In some embodiments, data volumes are replicated with two copies. A replication protocol can be used that can make both copies of a volume deterministically consistent, and that is agnostic to features on the server that use replication for durability like snapshots. This can greatly simplify the replication protocol itself since there can be fewer custom messages, and can allow various other distributed features to be built on a server using replication without ever having to touch the replication protocol.

As mentioned, conventional replication protocols can have problems with inconsistencies between copies. For example, a replication protocol can be inconsistent in certain edge cases, such as in the face of power failure, since much of the data is maintained in memory state. These data inconsistencies can incur operational load to investigate. Further, a conventional replication protocol can require in-depth knowledge of what is being replicated, such that every new feature that wants to use replication needs to change the replication protocol. Approaches in accordance with various embodiments attempt to overcome these and other deficiencies in existing approaches by providing consistency of all copies in all cases. Such a protocol can be agnostic to features using replication, such that there should be no changes to the replication protocol needed to implement a feature such as snapshotting or live migration. Further, such a protocol should not limit future improvements to the replication process, which may involve prioritized re-mirroring or cross-zone replication.

In various embodiments, data storage volumes can be presented as block devices to customers, addressable via read/write requests using an offset, length, and data. As mentioned, the data volume can be stored on a server as a type of persistent key-value store, such as a B-tree or other log-structured merge tree. In some embodiments, the storage on a server can be divided into portions, such as a log portion and a data partition. The log partition can consist of one or more devices, such as fast solid state drives (SSDs), with an appropriate log interface. The data partition can consist of a logical striping across a number of SSDs or magnetic drives, for example, and can present a block interface that can be written to randomly in at least some embodiments. There can be one log and one data partition per server, which can store multiple B-trees and associated data. In at least some embodiments the writes first go to the log and then can later be written to the data partition. In some embodiments the B-tree for a volume is stored in the log and the corresponding data, to which the B-tree points, is stored in either the log or the data partition. The B-tree can be stored by writing the nodes of the B-tree to the log and keeping the B-tree structure in memory, such as by using least recently used (LRU) demand paging so that the entire B-tree does not need to fit in memory at one time. To ensure consistency and durability of the data volume and B-tree, any changes to be made to the B-tree can first be sequenced, or tagged with an ever increasing operation number. The intent to change along with the operation number can then be written to the log, the entry in the log regarding the intent being referred to herein as a note. After durably storing the note, the system can commit the change by applying the update to the in-memory B-tree in a sequenced order, which is just an in memory operation. A customer writing to a data volume can then result in changes to the corresponding B-tree structure, which can be recorded as a note. A customer is only able to read the data, however, after the write of that data is committed. The same goes for any other data or metadata stored in the volume, as the data or metadata will be stored via a note only able to be read back after that note has been committed. Since commits are performed in a sequenced order, notes can be written to the log in parallel without worrying about the order in which those notes appear in the log. The system will always guarantee, however, that the changes will be applied according to the sequenced ordering, and not the order in which the changes are written to disk, even after an event such as a power failure. The B-tree for a volume can therefore be reconstructed in memory by replaying all the notes for that B-tree. To speed up recovery after power failure or restart, the B-tree structure can periodically be updated, as a checkpoint or otherwise, to the log.

A note for a customer write operation can contain information such as the offset for the write, the length, the operation number, and the data itself. The volume can map this to a key, value, data-reference store using an appropriate schema. One such schema includes a volume key, which can be a prefix to distinguish customer data, customer offset, and operation number. The schema can also include a volume value, which can refer to the data length, and a volume data reference, which can be a pointer to the location of the data. When a customer write note is committed, a B-tree node can be created based on the offset, length, and operation number in the note. The offset references the logical offset in the data volume, and the data-reference for that node points to the data in the note. The B-tree can then be updated by locating a key with the greatest offset that is less than the offset of the note along with the length. If such a key can be located, a determination is made as to whether the offset and length overlap the note being committed. If not, the node can be inserted as is. If some overlap is detected, the node that was found can be broken apart so that it no longer overlaps, which can mean in some instances that the node is deleted if the new one overlaps it completely. This process can be repeated until no more keys are detected where the offset/length overlap the data to be inserted. The volume storage engine can also support flushing of the data from the log to the appropriate data partition. Notes for customer writes include the data, such that all incoming writes can be written to the log. To free up space in the log, the storage server can periodically read the data reference and the associated data, write that data to the data partition, and replace the data reference with a pointer to a location on the data partition instead of the log. This enables that data to be removed from the log. This flushing can be performed asynchronously, enabling multiple customer writes to be merged together.

As mentioned, in many instances it will be desirable to replicate various data volumes. A replication process can be responsible for ensuring that both copies of the volume are the same, such as by copying the B-trees and ensuring that all changes done to the B-tree are applied in the same order on each copy. Lincoln Replication tracks these updates to the B-tree as operations. The operations can include, for example, customer writes and metadata updates such as volume provisioned input/output operations per second (TOPS), volume leases, and snapshot metadata. Each operation in at least some embodiments will have an ever-increasing operation number assigned, and the volume can be uniquely described by the sequence of operations. The replication process can guarantee that both copies have the same sequence of operations and will be executed in the same order.

One significant difference between such a replication process and conventional replication processes is that a replication process in accordance with various embodiments can ensure that the B-tree, which represents all metadata and data for a volume, is the same on both copies without knowing anything about what is contained within the B-tree, differences between nodes, etc., whereas legacy replication replicates the metadata and data for a volume, and hence has to have in-depth knowledge of the data. Advantageously, using a replication process in accordance with various embodiments enables anything built on top of the volume using the note and commit model to become a replicated feature for free.

While such a replication ensures that the B-tree structure is the same on both copies, the B-trees themselves may be different with respect to the data references. The keys and the values in the B-trees will be the same, since the data references point to physical offsets in the log or the data partition, and those will generally be different on different hosts. Furthermore, flushing can happen independently on each copy, such that on one copy the B-tree may point to data in the log whereas on the other it can point to the data partition. Between the two copies of a volume, one can be designated as a master copy and the other as a slave copy, where the client will be caused to connect to the master copy. When a volume is initially created, the volume can have a single copy referred to herein as a solo master. A solo master is a non-redundant copy of a volume. A slave copy can be created by the solo master as discussed elsewhere herein, and the solo master can start a re-mirroring process, wherein data is copied over to the slave. Once the slave is confirmed to have the same data as the master, the slave is designated as up-to-date or current, which enables the slave to take over and become a master copy if needed. In some embodiments, the communication between a master copy and a slave copy can be based upon a designated protocol, such as a single stream Transmission Control Protocol (TCP).

The replication process can use the note-commit model of the volumes to guarantee consistency between the master and slave copies for a volume. Customer writes are recorded as notes, and become readable after the note is committed, with notes and commits occurring on both the master and the slave copy. Once a client write operation is acknowledged, the customer should be able to read the data for read after write consistency, such that a write is only acknowledged in some embodiments if both the master copy and slave copy have recorded the note durably and the master has committed. The slave can only commit up to where the master has committed, and the master will provide information about the current commit point.

In at least one embodiment, the master will generate a note and send a copy of the note to the slave in response to a client write being received, which the slave can acknowledge. When the slave subsequently receives a write from the master, the slave can note the write and respond to the master. When the master receives the response from the slave and its own note has completed, the master can attempt to commit the write. The commit operation has to be performed in operation number order as discussed herein. Once the master has committed the write, the master can send an acknowledgement to the client. Both the master and the slave can track the commit point, which corresponds to the highest operation number that has been committed. When a master forwards an operation to a corresponding slave copy, the master can also forward its commit point to the slave. The slave can then attempt to commit, asynchronously, up to the commit point of the master.

There can be various aspects specified for such a process. For example, each operation noted in the log will have an operation number in at least some embodiments, which will be determined by the master during the note process. The operation number should be unique and ever increasing, and can be provided to the slave from the master. Notes can be out of order, as multiple operations can be noted in parallel, although operations are committed in sequential order. A customer write can be noted on both the master and the slave, if a slave exists, before it is acknowledged to the client. A customer write can also be committed on the master before it is acknowledged to the client, with the slave performing the commit asynchronously.

In various instances, such as when a volume is initially created or a slave copy fails, it can be desirable to provision a new slave copy. When a volume is created initially, the volume will only be on a single server and not be redundant. This initial volume is referred to herein as a solo master volume. Since the volume is not redundant at this point, a process can be initiated to provision a slave copy. Provisioning a new slave copy is done through a process referred to herein as state transfer, where a "state" of a volume refers to a point-in-time copy of the volume. A state of a volume can be comprised of at least two components, including the B-tree of the volume and the actual data. State transfer is the process of forwarding both the B-tree and the data to the slave copy. The master copy in at least some embodiments is still able to accept client I/O operations during the state transfer.

Figure 5:
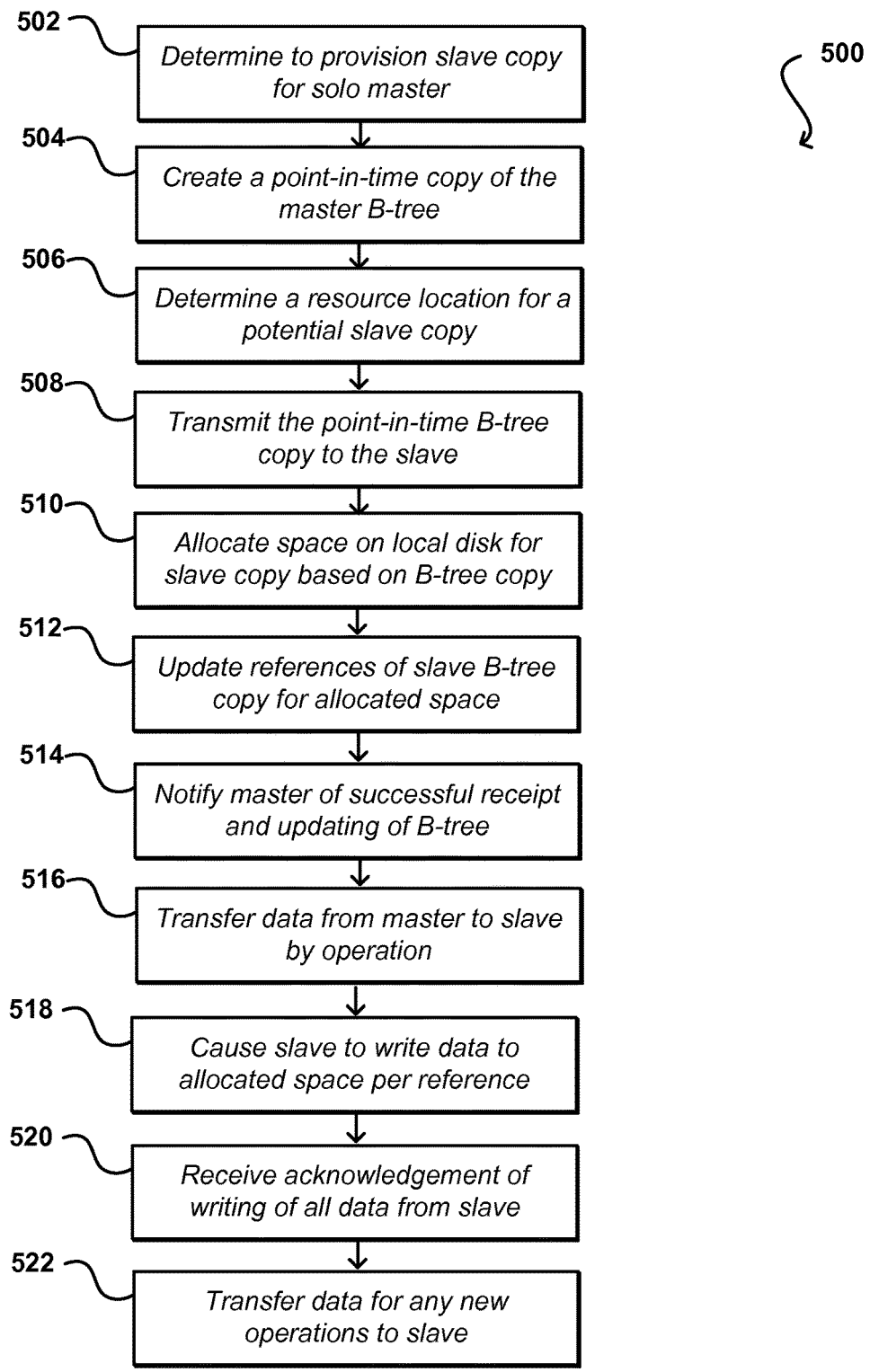
FIG. 5 illustrates a first example process for provisioning a slave copy that can be utilized in accordance with various embodiments.

FIG. 5 illustrates an example process 500 for provisioning a new slave copy that can be utilized in accordance with various embodiments. It should be understood for the various processes described herein that additional, fewer, or alternative steps or sub-processes can be performed in similar or alternative orders, or in parallel, within the scope of the various embodiments unless otherwise stated. In this example, a first step of a state transfer process involves a solo master determining sub-process 502 that determines a slave copy is to be provisioned. The solo master will create, via sub-process 504, a point-in-time copy of the master B-tree for the volume. This B-tree will contain the appropriate pointers for data stored by the master copy at the time of the creation of the point-in-time copy. Any data obtained or modified after the generation of the point-in-time copy will be managed by the solo master for subsequently being provided to the slave copy. The solo master can determine, via sub-process 506, a resource location for a potential slave copy, such as may have a sufficient amount of space to store a full copy of the data. As mentioned, in at least some instances a solo master will attempt to find a slave master with slightly more storage space than is needed in order to account for any additional data received during the provisioning process.

The solo master can transmit, via sub-process 508, the point-in-time copy of the B-tree to the determined slave. This point-in-time copy is referred to herein as a B-tree snapshot, and the presence of the point-in-time copy enables modifications to continue to be made to the B-tree of the master for client writes and other such operations. Information can be read from both the point-in-time snapshot of the B-tree and the current B-tree, enabling the solo master to continue noting and committing new operations. The solo master can also save the list of data ranges that need to be replicated to the slave. Any new operations will only happen on the solo master during this stage of the process, and the solo master can subsequently do a catch-up on those operations with respect to the slave copy. The copy operation can involve determining whether there is sufficient space on the slave copy for the data, and the process can abort if there is insufficient space on this particular slave. Another appropriate slave could then be determined. Since it is possible that the size of the master copy grows during the provisioning and the slave can no longer support the size, the process can also be aborted in such situations. Since the copying of the B-tree is relatively fast, however, very little time or effort will be lost in the event the B-tree copy operation fails. In at least some embodiments, more space is initially allocated for the slave copy than is needed in order to allow for some expansion of the data set during the provisioning process. At the completion of this step, the slave copy will have a copy of the B-tree that includes invalid data references for the slave copy (as the pointers point to data locations for the master copy).

Once the slave has a copy of the B-tree, the slave can attempt to fix or update the invalid data references so that the references are appropriate for the slave copy. The slave can read the entire B-tree and allocate, via sub-process 510, an appropriate amount of space on the local disk based on the copy of the B-tree. The slave copy can then update, via sub-process 512, the references of the slave B-tree copy to point to the appropriate locations of the allocated space. The slave will then have a B-tree with valid references for storage locations for the corresponding data, which will otherwise be the same as the point-in-time copy of the B-tree of the master. The slave can acknowledge, via sub-process 514, successful receipt and updating of the B-tree to the master, and can then accept new operations and fill the references with data from the master using the information in the B-tree.

As a third step in this example, the slave can write the data for each of the updated references. In this example the master transfers, via sub-process 516, the data to the slave in chunks, or groups of data, over specific data ranges that can correspond to specific operations or operation numbers. As the master reads through the list of data ranges to copy and forwards the corresponding data to the slave, the slave can perform writes, via sub-process 518, for the data received from the master. The master can provide a set of data for a particular operation and indicate the offset for the data, which the slave can use to perform a lookup in the B-tree and determine the location on the disk on the slave side to which to write the data. The master can use the point-in-time copy of the B-tree to ensure that the appropriate data is being provided to the slave. Once all the data is received from the master for the point-in-time B-tree and the slave has written all the data to local disk, an acknowledgement can be received, via sub-process 520, from the slave. The master can also transfer, via sub-process 522, to the slave any data for new operations that were received since the point-in-time copy was created, so that the slave becomes a current and accurate copy of the master.

At the same time that the slave is receiving data from the B-tree snapshot, the slave can also receive new operations from the master in at least some embodiments, which can be noted to the log, committed, and later flushed to the appropriate data partition. There thus can be two sources writing data concurrently to the data partition on the slave. A first source relates to data replicated from master and referenced by the point-in-time copy of the B-tree. A second source corresponds to the committed operation in the log being flushed to the data partition. These sources could have overlapped offsets and committed operations will have newer data, such that the data transferred from point-in-time B-tree references should not overwrite the committed operation data in at least some embodiments. In order to track which offset has data from flushed operations, the slave copy can create a tracking B-tree, which can be updated each time an operation is flushed to the data partition. When the slave reads data from the master for a certain offset range as part of the state transfer, the slave can query the tracking B-tree and skip copying data for the offset if the tracking B-tree indicates that there is operation flushed for that offset range. The slave can be designated as current, or up-to-date, when the solo master has caused the above steps to be performed and finished forwarding data for any operations that were accumulated during the creation of the slave copy. Once up-to-date, the slave can take over in the event of a failure of the master.

Figure 6:
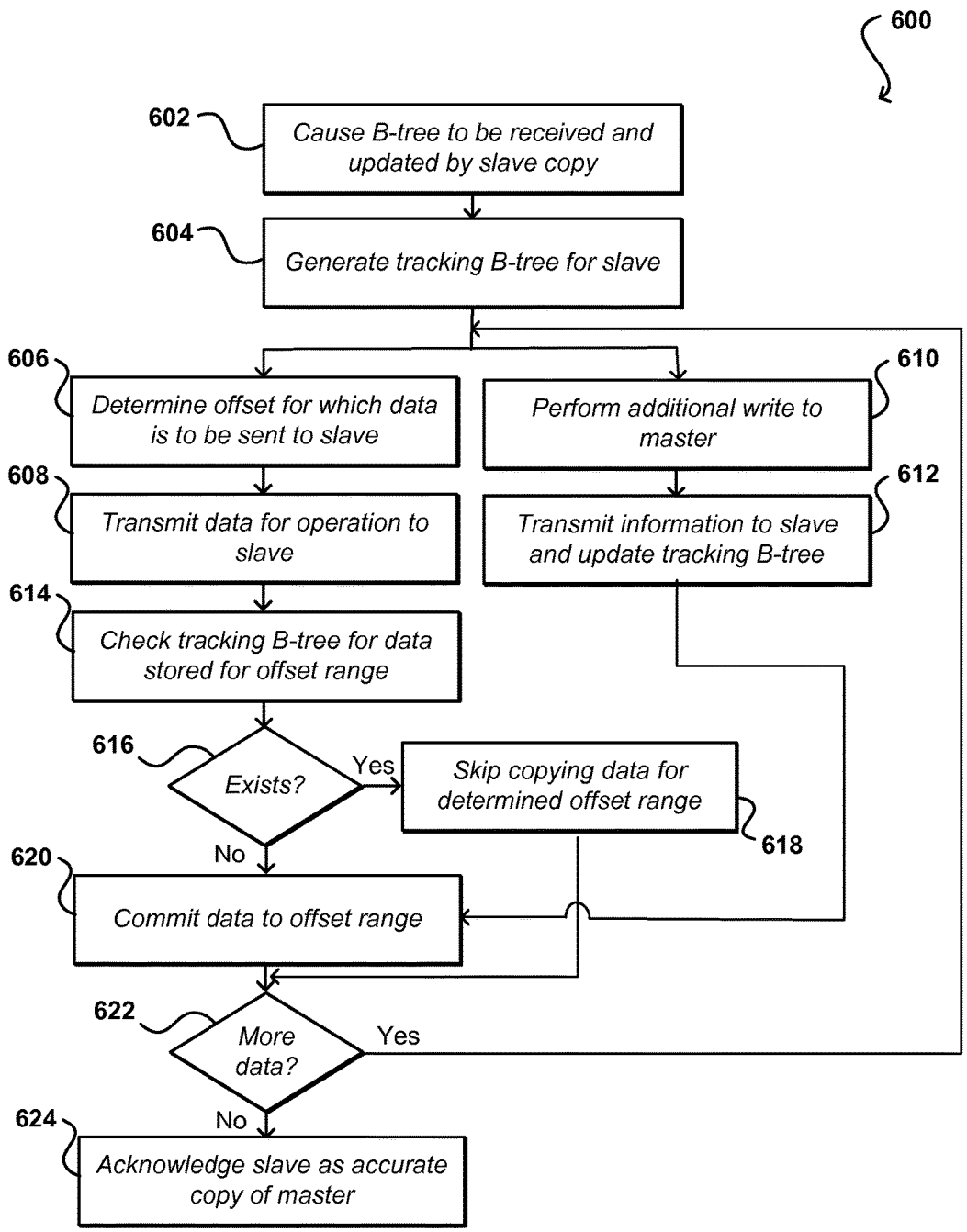
FIG. 6 illustrates a second example process for provisioning a slave copy that can be utilized in accordance with various embodiments.

FIG. 6 illustrates an example process 600 for provisioning a slave copy that allows for concurrent writes from multiple data sources and uses a tracking B-tree to commit only the current data for an offset range, which can be utilized in accordance with various embodiments. In this example, a B-tree snapshot for a master is caused, via sub-process 602, to be received and updated by the slave copy, such as is described with respect to the process of FIG. 5. In this example, the slave is able to receive data for the B-tree as well as information about new writes (or other operations) received to the master since the time the snapshot was generated. In order to keep track of the current data for each offset range, the slave can generate, via sub-process 604, a tracking B-tree that maintains information about data flushed for various offset ranges.

In order to cause the slave to store the data corresponding to the offsets of the B-tree snapshot, the master can determine, via sub-process 606, a next offset for which data is to be sent to the slave and then transmit, via sub-process 608, the corresponding data to the slave. Concurrently, the master may perform, via sub-process 610, additional writes (or deletes, modifications, etc.), committing those writes as appropriate, and transmit, via sub-process 612, information for those writes to the slave, which can cause information for any of those additional writes that are flushed to storage to be added to the tracking B-tree. For any data received from the master, a check can be made, via sub-process 614, against the tracking B-tree to determine whether any data (for a more recent operation) has already been flushed to storage for that particular offset range. If such data is determined to exist, via sub-process 616, the data to be written to that offset range can be skipped, via sub-process 618, discarded, or otherwise managed. If data has not already been flushed for that offset range, the data can be written and committed, via sub-process 620, to that offset range of the local storage for the slave copy. If there is more data to be committed to the slave for either the point-in-time snapshot or more recent operations determined via sub-process 622, then the process can continue, via a return flow to sub-process 606 or 610. Otherwise, the slave can be acknowledged, via sub-process 624, as a current or accurate copy of the master and the system can operate under conventional instructions to cause data to be written to the master and replicated to the slave as appropriate.

As described, a first step of such a process only requires transferring the point-in-time B-tree from the master, which generally will be much smaller than the actual data to be copied, such as where a 1 GB volume may have a 2 megabyte (MB) B-tree, and a 1 TB volume might have a 2 GB B-tree to replicate. This enables the slave to quickly determine whether adequate space is available for the data, and allocate that data as necessary, before the data transfer begins. If the provisioning of the slave needs to be cancelled or rolled back, for example, the determination can be made quickly with minimal unnecessary data transfer or delay. Further, fixing the references in the slave B-tree does not involve any data transfer and is all local to the slave, such that the entire process of creating and updating the tree can take a few minutes or less in at least some embodiments. This also minimizes the amount of data for new writes that must be stored during the provisioning process, which conserves resources and reduces the likelihood of an event that can cause inconsistencies between the copies, such as power failures or other such events.

For the provisioning of a new slave, the state transfer is bounded such that when the B-tree, and all the data references by the B-tree, is transferred then the state transfer is done. During the whole process of state transfer, the solo master can note and commit operations. Once the B-tree is transferred and the references are fixed, the slave copy can note, commit, and flush operations. State transfer can be resumed after a network disconnect, but will have to be restarted if either of the peers crashes or loses power. State transfer is necessary if a master is re-mirroring to a brand new copy in at least some embodiments. If a master is reconnecting back to an old slave that has partial data, the master can perform catch-up replication, which is a special kind of replication that should be faster than a full state transfer because the solo master only needs to replicate the operations that it receives during the time that it is not connected to the slave.

In at least some embodiments a most recent copy of the B-tree snapshot, or point-in-time copy, can be retained along with the current copy. In the event that a key is deleted from the B-tree, a new entry can be added in the new space that indicates the key was deleted. This entry indicates that the key is still available from the prior version if needed.

A data storage system in accordance with various embodiments can also take advantage of volume snapshots for purposes such as persisting data. A volume snapshot, generally speaking, can refer to a view or representation of a volume that exists in a block-based storage system, for example at a particular point in time. A server can track metadata for chunks of a data storage volume, such as a master storage volume, enabling a determination as to whether a chunk should be contained in a volume snapshot based on whether data has been written to that chunk since the last snapshot. Since the chunk metadata is stored as data by the master storage volume, the chunk metadata will be replicated over to the slave storage volume automatically.

The ability to track changes to specific volume chunks enables snapshots on a volume to be created incrementally, where each snapshot represents changes since the last snapshot on that volume. An initial snapshot on a volume can include the data for the entire volume in at least some embodiments, with the second snapshot forward including only the incremental changes. Further, a snapshot in at least some embodiments can be based at least in part upon "chunks" of data. A "chunk" as referred to herein is a block of data of a certain size, such as 512 KB or 4 MB, for example, where each block can be stored to a separate location in the block-based storage system. A snapshot can utilize a volume block representation where the representation is divided into chunks of equal size, whereby the "incremental" volume snapshot can include any chunk that includes data that has changed since the last successful snapshot on that volume. A chunk can be represented as an object in some block-based storage systems, and an example snapshot can contain a manifest file that lists all chunks associated with the snapshot.

If using such snapshots with conventional systems, complexity would arise from the need to track chunk metadata for incremental snapshots, as well as the tight coupling of that metadata to other data stored in the server. The loading and creating of snapshots would be tightly coupled, which can lead to various issues attempting to maintain the correct chunk metadata and ensure that the metadata is synchronized between peers. Using snapshots with various embodiments discussed herein, however, the chunk metadata can be decoupled from the rest of the server so that only the snapshot components need to be aware of the chunk metadata. Furthermore the loading from snapshot and creating of snapshots can be decoupled into two separate, loosely-coupled modules.

As mentioned, replication in accordance with various embodiments can ensure that any changes that occur on the master storage volume also occur on the slave storage volume in the same order. This enables the snapshot module to be considered for a single host, with failover provided at no (or little) additional cost due to the nature of the redundancy. As long as the snapshot module is able to recover and continue from a crash and restart of the server, the snapshot module will also be able to handle failover to a slave using the same mechanism. Another advantage is that such functionality provides for the thorough testing of the snapshot module on a single host, providing confidence that it will work in a redundant failover model.

In at least some embodiments, the creation of a volume snapshot can leverage a "view," or similar feature, of a data volume. A volume view, as used herein, is a durable, point-in-time read copy of the volume at the point in time the view was created and sequenced. A view is regarded as an operation on the volume for generating the point in time copy, such that the view will have an associated operation number. A view thus is considered to be durable since all changes—including its creation, updates, and deletion—are sequenced with operation numbers along with all other changes to a volume. Reading from a view can be functionally the same as reading from the volume as if no writes have occurred since the view was created. Reading from the view can provide the operation number and data of the highest writes for the offset range that occurred before the view was created. The operation will then be automatically replicated, and new customer I/O can be received and performed during the replication. This eliminates some of the complexity in previous approaches wherein additional logic was needed in order to replicate information about data snapshots.

Figure 7:
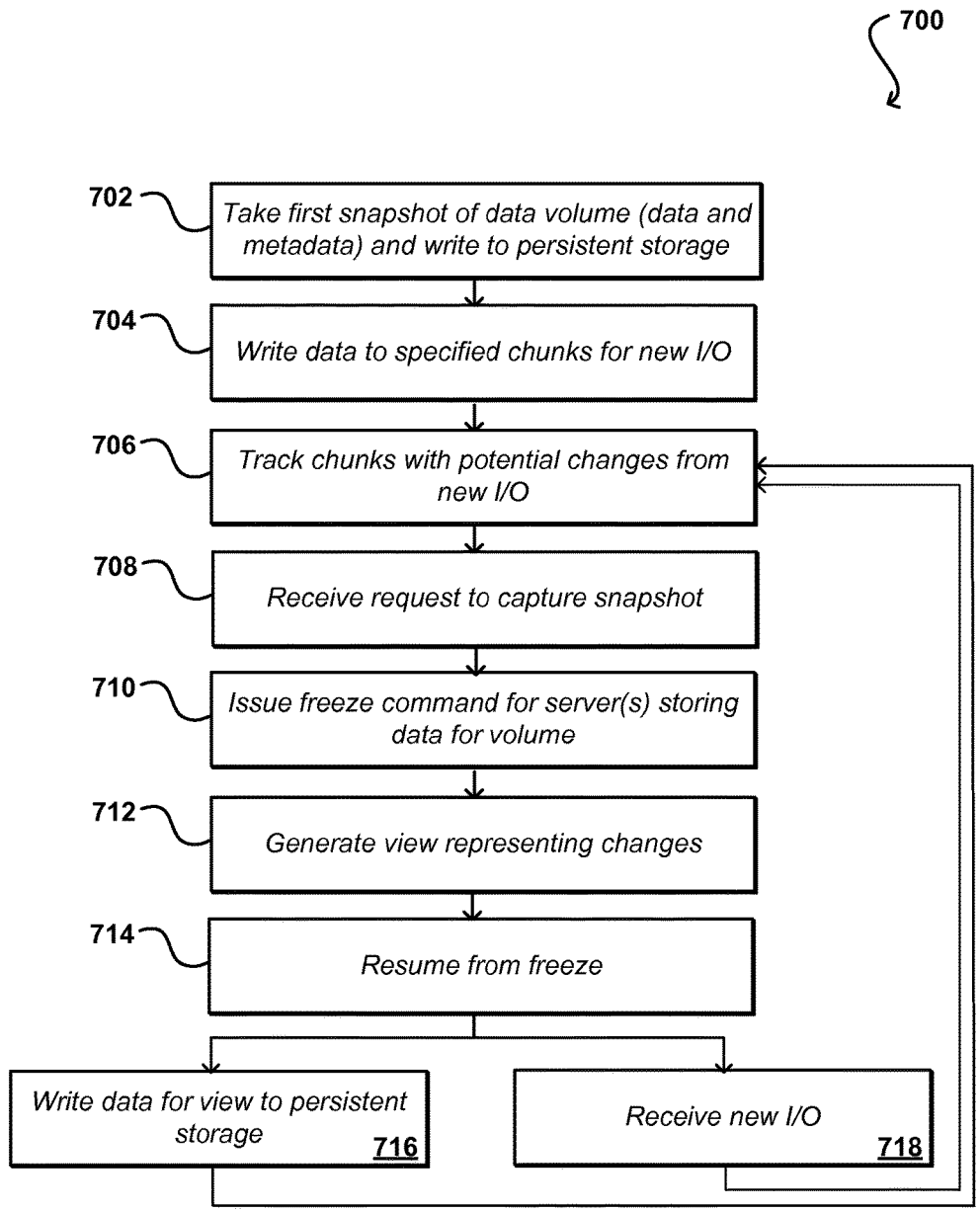
FIG. 7 illustrates an example process for writing data to persistent storage that can be utilized in accordance with various embodiments.

FIG. 7 illustrates an example process 700 for persisting data using snapshots that can be utilized in accordance with various embodiments. In this example, an initial snapshot is created or taken, via sub-process 702, for a storage volume and written to a block-based storage system, which includes both data and metadata. As new I/O operations are received, via sub-process 704, those operations can be assigned an operation number and written to specified chunks of the storage volume. The chunks of the volume affected by the operations can be tracked, via sub-process 706, such that the chunks with potentially different data since the previous snapshot can be determined. A request can be received, via sub-process 708, to capture a new snapshot. This can be a request that is generated automatically by a control plane service or a manually-generated request, among other such options. In order to generate a consistent request, a freeze command can be issued, via sub-process 710, that can be sent to any server or other device hosting a partition or other portion of the data storage volume. Once the servers are frozen, or temporarily not processing additional I/O operations, a view can be generated, via sub-process 712, that includes data, that has an operation number and identifies changes to the storage volume since the last view was captured. The view can also include information identifying the previously-captured view as mentioned previously. After the view is completed, the freeze or non-processing of additional I/O in the server is removed and the servers can resume, via sub-process 714, processing new I/O operations. The view can then be analyzed, such as by a master storage volume, whereby the master can read chunks of data from the view and cause the data (and metadata) for those chunks to be written, via sub-process 716, to an appropriate storage system. While writing to the storage system, the server(s) for the storage volume can receive, via sub-process 718, and process new I/O operations. The process can also periodically contact the persistent storage service to ensure the necessary credentials for the storage service are up to date. The snapshot will be stored in the persistent storage system, and described by a manifest with a list of chunks, in at least some embodiments.

In some embodiments, an intermediate server can be used to push data to persistent storage. For example, a server managing the storing of data for a view might push the data to an intermediate server instead of writing the data (and metadata) directly to persistent storage. The transfer to the intermediate server can be relatively fast, and can enable the primary server to focus resources on accepting and processing new I/O while the intermediate server writes the data to persistent storage. The intermediate server in some embodiments can be dedicated to pushing the data to storage. This also enables the primary server to delete the view data more quickly, freeing up additional resources on the primary server.

Figure 8:
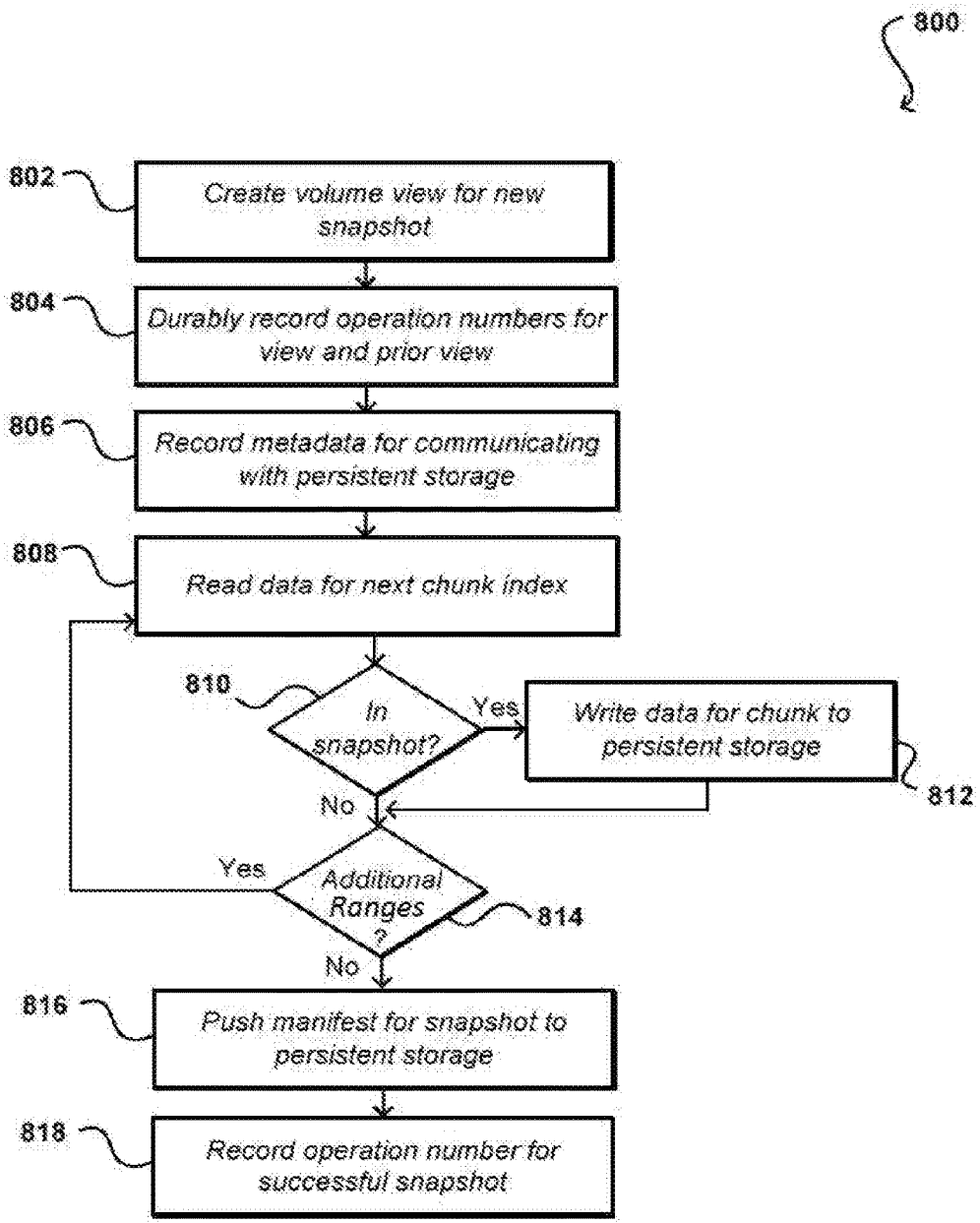
FIG. 8 illustrates an example process for generating a snapshot that can be utilized in accordance with various embodiments.

Snapshots in at least some embodiments will be processed in the order they are created due to the incremental nature of the snapshots. An incremental snapshot in such an embodiment will only be valid if the prior snapshots for the volume are also valid. An example workflow 800 for writing a snapshot to storage is illustrated in FIG. 8. In this process, a volume view is created, via sub-process 802, that represents a point in time copy of the corresponding volume. The operation number of the view and the operation number of the prior snapshot's view (or 0 if there are no proceeding snapshots for the volume) can be durably recorded, via sub-process 804. The metadata needed to communicate with the persistent storage system can also be recorded, via sub-process 806. The metadata can include information such as a backup identifier, access keys, secret keys, session tokens, and the like. The data written to the view can include data for operations having operation numbers lower than the operation number of the view itself. For every chunk index the metadata for the offset range of the chunk can be read, via sub-process 808, in ascending order. If it is determined, via sub-process 810, that the offset range has a write that is in-between the operation number of the current view and the previous view, then the chunk is in the snapshot. If the chunk is in the snapshot, then the data for the chunk can be read and the data for the chunk can be written, via sub-process 812, to the block-based storage system. After completing the analysis for each chunk, the metadata can be recorded durably if it was pushed to the storage system. The current chunk number can also be updated. There will be no issue in the situation where the same chunk is written to the block-based storage system multiple times.

A determination can be made, via sub-process 814, as to whether there are additional offset ranges for the volume. If so, the process can continue at sub-process 808. If not, a change-set manifest can be pushed, via sub-process 816, to persistent storage that lists all the chunk indices that were pushed for the corresponding volume snapshot. It can be verified the snapshot completed successfully. If so, the operation number of the snapshot view can be recorded, via sub-process 818, for use in the next snapshot. If the snapshot process encounters any errors or otherwise does not complete successfully, the operation number for this snapshot view can be discarded and the next snapshot can use the snapshot view operation number of the previous successfully completed snapshot view.

It should be noted that the snapshot creation process of FIG. 8 does not mention the slave storage volume. As mentioned, the snapshot metadata operations are all performed as notes and commits to the volume B-tree, for example, such that they will be automatically replicated to the slave storage volume. Further, since the snapshot metadata is recorded durably, a snapshot module can read in the metadata and continue where it left off in the event of a crash and restart, hot restart, or other such occurrence. Snapshots can be processed only for the master slave volume, with the slave snapshot module not performing any such action. If the master storage volume fails and the slave storage volume takes over, the slave storage volume can perform the same steps as for a crash and restart, which may include reading in the snapshot metadata and continuing from wherever the slave volume is in the process. In at least some embodiments there are no snapshot metadata updates in line with client I/O operations, which remove much of the complexity otherwise involved in attempting to synchronize the master and slave chunk metadata.

The only piece of information that the snapshot creation module needs to share with the load from snapshot module, in at least some embodiments, is the operation number of the view for the latest successfully completed snapshot. The load from snapshot module can use that operation number to determine the offset ranges that can be loaded from snapshot. If the offset range has an operation number that is less than the operation number for the snapshot view, a valid copy of the data can be determined to be in the snapshot and can be loaded from persistent storage.

In one embodiment, the metadata that the snapshot will durably record for each snapshot will include the latest successful view operation number. The metadata to be recorded can also include a view identifier, a view operation number, a chunk size, a current chunk index, and a list of chunk indices that were written to the block-based storage system. The metadata can also include metadata for the backup, such as may include a backup identifier, an access or secret key, a session token, a chunk prefix, and the like.

In at least some embodiments, a data storage volume enables the existing view to be updated as well. When a view is created, the view can constitute the entire range of the volume. The view can then be updated to make it a smaller piece of the volume. Once a piece of data of the volume has been pushed to a persistent storage system (i.e., distributed, disk-based, or block storage), for example, that part of the view can be eliminated from the underlying storage in order to free up space in the storage volume.

In at least some embodiments a volume may be comprised of multiple data partitions that may be distributed across multiple servers or other such devices. Before taking the snapshot, a "freeze" command or similar instruction can be sent to all the partitions for the volume. The freeze command causes all I/O processing to be stopped over a brief period of time. This enables a consistent copy of the volume to be obtained across all partitions for the volume. As soon as the freeze action is initiated for all partitions, a control plane service that measures the snapshots can then send a snapshot command to all of the partitions. An operation can then be generated that has an operation number and causes a new view to be created. Once the view is properly created, or the end of the period of time is reached, among other possibilities, the partitions can resume processing I/O for the volume.

Figure 9:
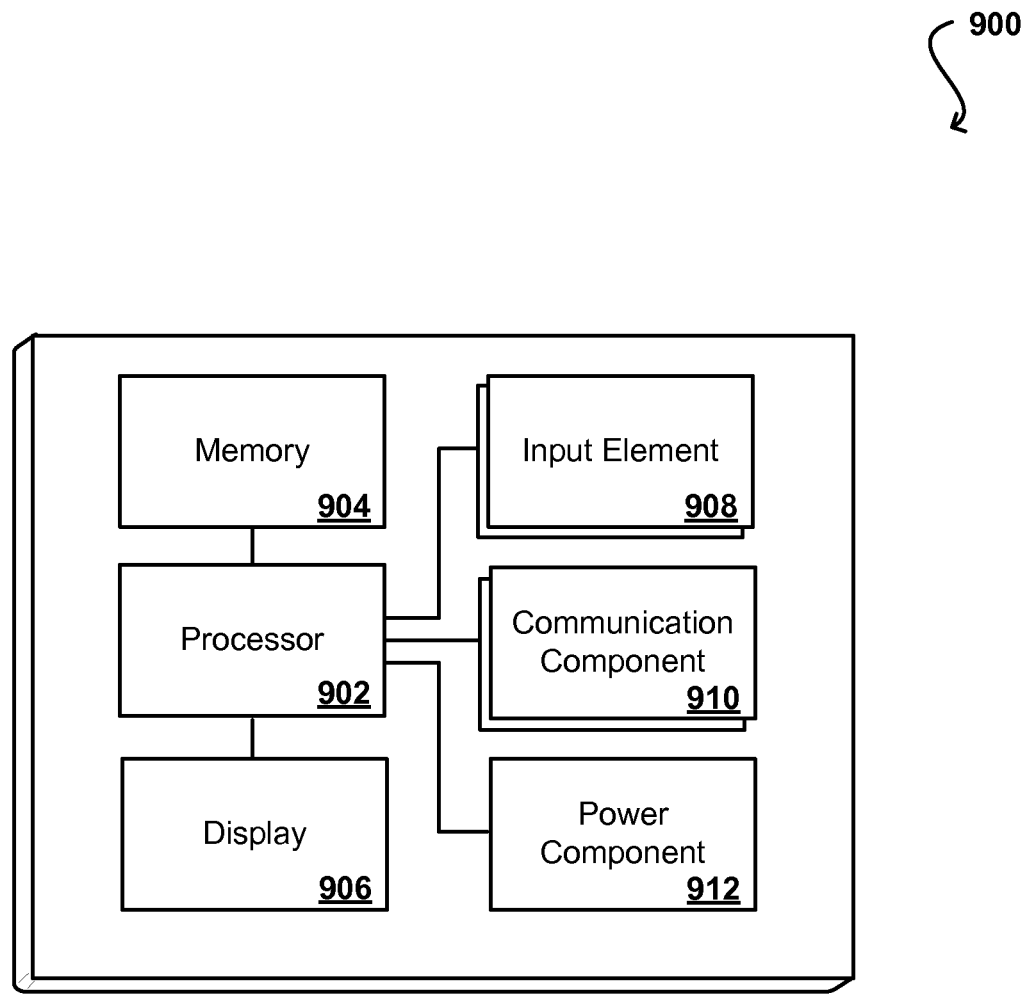
FIG. 9 illustrates components of an example computing device that can be used to perform aspects of the various embodiments.

FIG. 9 illustrates a logical arrangement of a set of general components of an example computing device 900 that can be used to implement aspects of the various embodiments. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device may include some type of display element 906, such as a touch screen or liquid crystal display (LCD), although devices such as portable media players might convey information via other means, such as through audio speakers. In some embodiments, the computing device 900 can include one or more networking and/or communication elements 908, such as a WiFi®, Bluetooth®, radio frequency (RF), wired, or wireless communication system. The device in many embodiments can communicate with a network, such as the Internet, and may be able to communicate with other such devices. In some embodiments the device can include at least one additional input component or element 910 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The device will also include one or more power components 912, such as a power source, battery compartment, wireless charging circuitry, and the like, for providing and/or obtaining the power needed for the computing device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include a computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UpnP), Network File System (NFS), and Common Internet File System (CIFS). The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol (HTTP) servers, FTP servers, Common Gateway Interface (CGI) servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python °, or Tool Command Language (Tcl), as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable non-transitory media implemented in any method or technology for storage of information such as computer readable instructions, data structures, program modules, or other data, including RAM, ROM, electrically erasable programmable read-only memory (EEPROM), flash memory or other memory technology, Compact Disc Read-Only Memory (CD-ROM), digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   maintaining a master storage volume and a slave storage volume in a block-based storage system, the master storage volume including a list of key-value pairs for tracking data of the master storage volume by offset and operation number, the slave storage volume providing a redundant copy of the master storage volume;
   receiving a request to write the data of the master storage volume to persistent storage;
   creating a snapshot for the master storage volume using a data view of the master storage volume, the data view being assigned a next sequential operation number and identifying chunks of the master storage volume to which writes were performed for operations having a respective operation number between the operation number of the data view and an operation number of a prior data view written to the persistent storage;
   writing, in sequential order, the identified chunks of the data from the master storage volume to the persistent storage; and
   writing, to the persistent storage, the operation number of the data view and the operation number of the prior data view in response to the identified chunks of the data being successfully written to the persistent storage.

2. The computer-implemented method of claim 1, further comprising:
   generating a manifest for the snapshot, the manifest including respective chunk indices for the identified chunks included in the snapshot; and
   writing the manifest to the persistent storage.

3. The computer-implemented method of claim 1, further comprising:
   processing additional I/O operations via the master storage volume while the writing of the identified chunks of the data to the persistent storage is in process, the additional I/O operations being assigned next highest operation numbers according to a monotonically increasing operation number sequence; and
   replicating the additional I/O operations to the slave storage volume.

4. The computer-implemented method of claim 1, further comprising:
   before generating the data view, issuing a freeze command to stop processing new I/O operations; and
   processing the new I/O operations after the data view is generated.

5. The computer-implemented method of claim 1, further comprising:
   generating the data view, the data view including respective operation numbers for change to the data view and changes to the master storage volume since creation of the data view.

6. A computer-implemented method, comprising:
   maintaining a master copy and a slave copy of a data volume, the master copy including data for a plurality of operations having respective sequential operation numbers, the data for the plurality of the operations being replicated to the slave copy;
   generating a snapshot of the master copy, the snapshot being assigned a next operation number in an operation number sequence, the snapshot including snapshot data for operation numbers between an operation number of a prior snapshot and an operation number of the snapshot, the snapshot being replicated to the slave copy;
   writing the snapshot data, as well as the operation number and metadata for the snapshot, to the persistent storage; and
   while writing the snapshot data to persistent storage, causing subsequent I/O operations to be assigned respective operation numbers in sequence and processed by the master copy.

7. The computer-implemented method of claim 6, further comprising:
   generating the snapshot using a data view for the master copy, the data view identifying chunks of the master copy to which data has been written since a previous data view, the data view and modifications of the data view being assigned respective operation numbers.

8. The computer-implemented method of claim 6, further comprising:
   issuing a freeze command before generating the snapshot, the freeze command causing servers to temporarily stop processing I/O operations until after the snapshot is generated.

9. The computer-implemented method of claim 6, wherein the master copy and the slave copy are data storage volumes in a block-based storage system.

10. The computer-implemented method of claim 9, wherein the master copy and the slave copy include a list of key-value pairs indicating data offsets and operation numbers of data stored respectively therein.

11. The computer-implemented method of claim 6, further comprising:
   tracking metadata for chunks of data in the master copy, the metadata indicating whether a respective chunk is to be included in the snapshot.

12. The computer-implemented method of claim 11, further comprising:
   storing the metadata at an offset associated with an operation number, wherein the metadata is replicated to the slave copy using the operation number associated with the offset.

13. The computer-implemented method of claim 11, further comprising:
   generating a manifest for the snapshot, the manifest including respective chunk indices; and
   writing the manifest to the persistent storage.

14. The computer-implemented method of claim 11, further comprising:

writing snapshot data to an intermediate server that is configured to cause the snapshot data to be written to persistent storage.

15. The computer-implemented method of claim 11, further comprising:
modifying a view in the master copy, associated with the snapshot, to remove any data that has been pushed to the persistent storage.

16. A system, comprising:
at least one processor;
a block-based storage system; and
memory including instructions that, when executed by the at least one processor, cause the at least one processor to:
store a master copy and a slave copy of a data volume in the block-based storage system, the master copy including data for a plurality of operations having respective sequential operation numbers, the data for the sequential operations numbers being replicated to the slave copy;
generate a snapshot of the master copy, the snapshot being assigned a next operation number in an operation number sequence, the snapshot including snapshot data for operation numbers between an operation number of a prior snapshot and an operation number of the snapshot, the snapshot being replicated to the slave copy using the operation number of the snapshot;
write the snapshot data, as well as the operation number and metadata for the snapshot, to the persistent storage; and
while writing the snapshot data to persistent storage, cause subsequent I/O operations to be assigned respective operation numbers in sequence and processed by the master copy.

17. The system of claim 16, wherein the instructions when executed further cause the at least one processor to:
generate the snapshot using a data view for the master copy, the data view identifying chunks of the master copy to which data has been written since a previous data view, the data view and modifications of the data view being assigned respective operation numbers.

18. The system of claim 16, wherein the instructions when executed further cause the at least one processor to:
issue a freeze command before generating the snapshot, the freeze command causing servers to temporarily stop processing I/O operations until after the snapshot is generated.

19. The system of claim 16, wherein the instructions when executed further cause the at least one processor to:
track metadata for chunks of data in the master copy, the metadata indicating whether a respective chunk is to be included in the snapshot.

20. The system of claim 19, wherein the instructions when executed further cause the at least one processor to:
generate a manifest for the snapshot, the manifest including respective chunk index for the respective chunks to be included in the snapshot; and
write the manifest to the persistent storage.

* * * * *